Patented June 26, 1945

2,379,312

UNITED STATES PATENT OFFICE 2,379,312

REACTION PRODUCTS OF ALKYLATED PHENOLS AND TERPENE-PHOSPHORUS SULPHIDE

Robert L. May, Chicago, Ill., assignor to Sinclair Refining Company, New York, N. Y., a corporation of Maine No Drawing. Application July 15, 1944, Serial No. 545,192

6 Claims. (Cl. 260—137)

This invention relates to a novel composition of matter and more particularly to a new class of compounds resulting from the reaction of an alkylated phenol with a condensation product of turpentine and phosphorus sulphide.

In my co-pending application, Serial No. 494,688 filed July 14, 1943, I have described and claimed a new class of resin-like materials resulting from the condensation of certain phosphorus sulphides, including phosphorus pentasulphide, with a terpene such as turpentine. I have now discovered that the condensation product of turpentine and phosphorus pentasulphide, therein described will react with alkylated phenols for instance cresylic acid, xylenols, p-tert-amyl phenol, diamyl phenol, butene alkylated phenols and the like, to form a new class of compounds of marked commercial values particularly as addends in lubricating oils, as more fully described in my co-pending application, Serial No. 545,193 filed July 15, 1944; and as intermediate materials in the synthesis of other valuable products.

The characteristics of the products of my present invention varies somewhat, depending upon the characteristics of the turpentine-$P_2S_5$ condensation product and the nature and proportions of the alkylated phenol used in its production. Generally, these compounds are relatively acidic and are highly soluble in mineral oils.

The invention will hereinafter be illustrated by specific examples of my new class of compounds. Since the characteristics of the products are to a substantial extent affected by the characteristics of the turpentine-$P_2S_5$ condensation products used in their preparation, description of the preparation of the condensation products used is included in these specific examples. Accordingly, the description of the preparation of the various products will include two steps, i. e., the preparation of the intermediate material and the preparation of the final product. However, it will be understood that the compounds of my present invention may be prepared from a previously prepared turpentine-$P_2S_5$ condensation product.

In the preparation of the intermediate condensation product for use in the preparation of the products of my present invention, the molar ratio of turpentine to $P_2S_5$ used is with advantage about 3:1. However, this ratio may vary somewhat in either direction. For instance, highly desirable products may be produced from intermediate products in the preparation of which the molar ratio of turpentine to $P_2S_5$ is within the range of about 5:2 to about 7:2.

The reaction of turpentine with $P_2S_5$ is highly exothermic and proceeds spontaneously after being initiated by slightly heating. A desirable method of effecting the reaction is to heat the turpentine in a vessel to about 200° F. or slightly higher and then without further heat, slowly stirring in the phosphorus pentasulphide in the powdered form. The heat of the reaction is great and consequently the addition should be made slowly so as to avoid the possibility of the reaction's becoming uncontrollable. The product of my present invention is favorably affected by the use of a turpentine-$P_2S_5$ condensation product in the preparation of which the temperature during the mixing is not permitted to exceed about 250° F., although higher temperatures are permissible.

After the addition is completed, it is usually necessary to apply heat externally to complete the reaction. The temperature during this latter stage is preferably maintained at about 300° F. though temperatures of about 200–400° F. may be employed. The second stage should be continued until all of the $P_2S_5$ is dissolved. The material thus prepared is a viscous liquid at elevated temperatures which solidifies on cooling to room temperature.

In general, compounds of the class of my present invention may be prepared by adding the alkylated phenol gradually to the turpentine-$P_2S_5$ condensation product advantageously at a temperature of about 230° F. The optimum temperature of the condensation product for the introduction of the alkylated phenol will vary depending upon the particular phenol used.

During the final step in the production of the turpentine-$P_2S_5$ condensation product, the temperature will generally be substantially in excess of 230° F., usually about 300° F., and in commercial operation 2 to 3 hours would normally be required for lowering the temperature to 230° F. by natural cooling. Such cooling is usually unnecessary in the preparation of my new compounds and may be avoided, for since the alkylated phenols are relatively stable toward heat, they may safely be admixed with the turpentine-$P_2S_5$ condensation product at temperatures as high as 300° F.

In reacting the alkylated phenol with the turpentine-$P_2S_5$ condensation product, very little heat is evolved. After the alkylated phenol has been added, the mixture is maintained at an elevated temperature, advantageously about 200° F., for about 1 hour with stirring.

The proportions of the alkylated phenol to be added may be varied over a considerable range depending upon the particular characteristics of the product desired. The optimum proportion of alkylated phenol used is, to a considerable extent, dependent upon the ratio of turpentine to $P_2S_5$ used in the preparation of the intermediate material. Generally satisfactory results have been obtained using proportions of reactants equivalent to about 2 moles of $P_2S_5$, about 6 moles of turpentine, and about 3 moles of alkylated phenol, assuming the molecular weight of the turpentine to be 136. The ratio of the several constituents may be varied somewhat. For example, for each 2 moles of $P_2S_5$, 5 to 7 moles of turpentine and 1 to 5 moles of alkylated phenol may be used. However, I have found it desirable that the total of the number of moles of turpentine and alkylated phenol used for each two moles of $P_2S_5$ fall within a range of about 8 to 10.

I cannot, at present, definitely identify my novel class of materials by chemical formula. However, in the preparation of the turpentine-$P_2S_5$ condensation product used in the production of these materials, I have found it desirable that no unreacted $P_2S_5$ be present in the condensation product to be reacted with the alkylated phenol.

In the preparation of my improved class of compounds considerable latitude is permissible in the selection of the alkylated phenol used. In general, the alkyl radical of the alkylated phenol should be a saturated aliphatic group. Each molecule of the alkylated phenol may contain one or more such groups. The number of carbon atoms in each aliphatic group is not critical. Desirable products may be obtained where each such group contains from 1 up to 12 to 16, or even up to 25 to 35 carbon atoms. Alkylated phenols containing 5 or more carbon atoms in each alkyl group have been found especially desirable, particularly in the preparation of compounds to be used as lubricating oil addends, because of the greater oil solubility of the resultant products. The alkyl group or groups may be either normal or branched chain.

Alkylated phenols, herein designated codimer alkylated phenols, such as prepared by the reaction, in the presence of sulphuric acid, of phenols with the olefines in commercial codimer, resulting from the phosphoric acid polymerization of mixed olefines of 4 carbon atoms or less per molecule and comprising propylene, butene-1, butene-2 and iso-butylene, the codimer consisting of a major portion of $C_8$ olefines, together with some $C_6$, $C_7$, $C_9$, $C_{10}$, $C_{11}$, $C_{12}$ and higher olefines, have been used with advantage. These codimer alkylated phenols are comprised primarily of mono- and poly-alkylated phenols having alkyl groups, as noted above, but with $C_8$ alkyl groups predominating.

I have further used with advantage in the preparation of the compounds of my present invention, alkylated phenols, herein designated codimer bottoms alkylated phenols, prepared by the method just described for the preparation of codimer alkylated phenols except that the phenol was reacted with codimer bottoms, the codimer bottoms used being the bottoms obtained by a redistillation of the previously described codimer to a 350 to 360° F. end point overhead. This bottoms was comprised primarily of $C_{12}$ olefines, but contains some somewhat lower and some somewhat higher molecular weight olefines.

The upper boiling xylenols, herein referred to, were commercial products obtained from coal tar and had a boiling range of 415° F. to 433° F. and were comprised primarily of a mixture of dimethyl phenols.

The following specific examples of various members and the procedure by which they have been successfully prepared are given as illustrative of the group.

*Example I*

2040 grams of turpentine was placed in a flask equipped with a stirrer, a thermometer, and a funnel and heated therein to 240° F. To this there was slowly added with stirring 1110 grams of powdered phosphorus pentasulphide at at rate such that the temperature of the material was not raised to above 275° F. After all the phosphorus pentasulphide had been added, the temperature of the mixture was raised to 300° F. and maintained at that temperature for about 2 hours, with continued stirring, at the end of which time all the phosphorus pentasulphide had become dissolved and the product was a viscous, amber colored liquid.

This turpentine phosphorus pentasulphide condensation product was then allowed to cool to about 230° F. and while at this temperature 810 grams of cresylic acid was added and the temperature maintained at about 200° F. with stirring for about 1 hour.

The resultant product was found by analysis to have an acid number of 56.7, a saponification number of 153.5 and to contain 7.71% phosphorus and 20.12% sulphur.

*Example II*

To a turpentine-$P_2S_5$ condensation product, prepared as in Example I from 1110 grams of $P_2S_5$ and 2040 grams of turpentine cooled to a temperature of 230° F., there was added 910 grams of upper boiling range xylenols, previously identified herein, and the mixture stirred for about 1 hour at 190–200° F. The resultant product was found by analysis to have an acid number of 52.2, a saponification number of 147.9 and to contain 7.49% phosphorus and 19.8% sulphur.

*Example III*

To a turpentine-$P_2S_5$ condensation product prepared as in Example I from 2040 grams of turpentine and 1110 grams of $P_2S_5$ cooled to a temperature of 230° F., there was added 1230 grams of p-tert-amylphenol and the mixture heated for about 1 hour at 200° F. with stirring. The resultant product was found by analysis to have an acid number of 46.5 and a saponification number of 132.1 and to contain 6.82% phosphorus and 17.4% sulphur.

*Example IV*

To the turpentine-$P_2S_5$ condensation product, prepared as in Example I from 2040 grams of turpentine and 1110 grams of $P_2S_5$, cooled to a temperature of 230° F., there was added 1755 grams of diamyl phenol and the mixture heated with stirring for about 1 hour at a temperature of 190° F. to 200° F. The product was found by analysis to have an acid number of 51.2, a saponification number of 120.4 and to contain 6.26% phosphorus and 16.3% sulphur.

*Example V*

To a turpentine-$P_2S_5$ condensation product, prepared as in Example I from 2040 grams of turpentine and 1110 grams of $P_2S_5$, cooled to a temperature of 230° F., there was added 1425 grams of a butene alkylated phenol having a phenol number of 294.3 and an apparent molecular weight of 190. The mixture was heated for 1 hour at 200° F. with stirring. The resultant product was found by analysis to have an acid number of 57.5, a saponification number of 136.0 and to contain 7.13% phosphorus and 17.82% sulphur.

Example VI

A turpentine-$P_2S_5$ condensation product, prepared as in Example I from 2040 grams of turpentine and 1110 grams of $P_2S_5$, was admixed with 2050 grams of codimer alkylated phenol having a phenol number of 203.7 and an apparent molecular weight of 275 and the mixture heated at 200° F. for 1 hour with stirring. The product was found by analysis to have an acid number of 51.3 and a saponification number of 117.6 and to contain 5.70% phosphorus and 15.82% sulphur.

Example VII

A turpentine-$P_2S_5$ condensation product, prepared as in Example I from 2040 grams of turpentine and 1110 grams of $P_2S_5$, was admixed with 2670 grams of codimer bottoms alkylated phenol consisting of equal proportions of a codimer bottoms alkylated phenol having a phenol number of 125.9 and an apparent molecular weight of 445 and a codimer bottoms alkylated phenol having a phenol number of 124.7 and an apparent molecular weight of 448. The mixture was heated for 1 hour at 200° F. with stirring. The product was found by analysis to have an acid number of 45.8 and a saponification number of 98.0 and to contain 4.82% phosphorus and 12.68% sulphur.

The turpentine-$P_2S_5$ condensation product from which the members of my new class of compounds are prepared is, in the absence of excess turpentine, normally a brittle, resinous solid. It is with advantage prepared from turpentine, steam-distilled wood turpentine or gum spirits, consisting mainly of alpha pinene, bi-cyclic terpene having the empirical formula $C_{10}H_{16}$. Pure alpha pinene and other more costly terpenes will react similarly with $P_2S_5$ but, for reasons including economic considerations, I prefer to use the more readily available turpentines. The turpentine used in the specific examples herein was a technically grade, steam-distilled turpentine comprising about 90% alpha pinene.

I claim:

1. The product resulting from the reaction of an alkylated phenol with a condensation product of turpentine and phosphorus pentasulphide, the alkyl group being a saturated aliphatic radical.

2. The product resulting from the reaction of an alkylated phenol with a condensation product of turpentine and phosphorus pentasulphide, the alkyl group being a saturated aliphatic radical containing at least 5 carbon atoms.

3. The product resulting from the reaction of poly-alkylated phenol with a condensation product of turpentine and phosphorus pentasulphide, the alkyl groups being saturated aliphatic radicals.

4. The product resulting from the reaction of an alkylated phenol with a condensation product of turpentine and phosphorus pentasulphide, the alkyl groups being saturated aliphatic radicals of 8 to 12 carbon atoms each.

5. The product resulting from the reaction of p-tertiary-amylphenol with a condensation product of turpentine and phosphorus pentasulphide.

6. The product resulting from the reaction of diamylphenol with a condensation product of turpentine and phosphorus pentasulphide.

ROBERT L. MAY.